(12) United States Patent
Lee (10) Patent No.: US 8,740,445 B2
(45) Date of Patent: Jun. 3, 2014

(54) BACKLIGHT ASSEMBLY AND METHOD OF ASSEMBLING A BACKLIGHT ASSEMBLY

(75) Inventor: Sang-Hwan Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 100 days.

(21) Appl. No.: 13/461,494

(22) Filed: May 1, 2012

(65) Prior Publication Data

US 2012/0287672 A1    Nov. 15, 2012

(30) Foreign Application Priority Data

May 13, 2011 (KR) .................. 10-2011-0044896

(51) Int. Cl.
*F21V 7/04* (2006.01)

(52) U.S. Cl.
USPC ............ 362/632; 362/609; 362/633; 362/634

(58) Field of Classification Search
USPC .......................... 362/632, 633, 634, 612, 613
See application file for complete search history.

(56) References Cited

U.S. PATENT DOCUMENTS

| 8,562,200 | B2* | 10/2013 | Park | 362/633 |
| 2010/0110334 | A1* | 5/2010 | Oki et al. | 349/62 |

FOREIGN PATENT DOCUMENTS

| JP | 2005099619 A | 4/2005 |
| JP | 2007250197 A | 9/2007 |
| JP | 2009098556 A | 5/2009 |
| KR | 102010071533 A | 6/2010 |

* cited by examiner

*Primary Examiner* — Evan Dzierzynski
(74) *Attorney, Agent, or Firm* — Cantor Colburn LLP (57) ABSTRACT

A backlight assembly includes a first light-emitting module, a light guide plate, a receiving container and a main adhesion member. The first light-emitting module includes a first circuit board including a first mounting surface, and a first light source on the first mounting surface. The light guide plate is on the first mounting surface and guides light from the first light source. The receiving container includes a bottom portion and receives the first light-emitting module and the light guide plate. The main adhesion member is between the first mounting surface and the light guide plate and is attached to the first circuit board and the light guide plate, and is between the light guide plate and the bottom portion and movable with respect to the light guide plate.

20 Claims, 6 Drawing Sheets

BACKLIGHT ASSEMBLY AND METHOD OF ASSEMBLING A BACKLIGHT ASSEMBLY

This application claims priority to Korean Patent Application No. 2011-0044896, filed on May 13, 2011, and all the benefits accruing therefrom under 35 U.S.C. §119, the contents of which are herein incorporated by reference in its entirety.

BACKGROUND OF THE INVENTION

1. Field of the Invention

Exemplary embodiments of the invention relate to a backlight assembly and a method of assembling a backlight assembly. More particularly, exemplary embodiments of the invention relate to a backlight assembly used for a display apparatus and a method of assembling a backlight assembly.

2. Description of the Related Art

Generally, a display apparatus includes a display panel displaying an image using light and a backlight assembly providing the light to the display panel. The display panel includes a display substrate including a thin-film transistor ("TFT") for driving a pixel and an opposite substrate facing the display substrate. The display panel includes a liquid crystal layer including liquid crystal molecules as a display element interposed between the display substrate and the opposite substrate. When a voltage is applied to the liquid crystal layer, the liquid crystal molecules control a transmittance of light provided from the backlight assembly so that the display apparatus may display the image.

When the backlight assembly is an edge-illumination type, the backlight assembly includes a light-emitting unit generating light and a light guide plate for efficiently guiding the light received from the light-emitting unit to the display panel. As a light source of the light-emitting unit, a light-emitting diode having high luminance is generally used. A plurality of the light-emitting diodes is spaced apart from each other to be arranged in all directions by a predetermined distance, which is different from a cold cathode fluorescent lamp ("CCFL"). An incident surface of the light guide plate may be divided into first regions facing each of the light-emitting diodes and second regions facing separate regions between the light-emitting diodes. A distance between the light-emitting diodes and the incident surface is a factor of determining a light efficiency of the backlight assembly based on an amount of the light lost to an outside of the backlight assembly.

However, when the number of the light-emitting diodes is increased, the light guide plate is thermally expanded by heat emitted from the light-emitting diodes to change the distance between the light-emitting diodes and the light guide plate or to deform a shape of the light guide plate. Thus, the amount of the light lost between the light-emitting diodes and the light guide plate is increased so that luminance of the light may be decreased. In addition, the luminance differs between the first regions directly receiving the light and the second regions indirectly receiving the light, so that the luminance may be non-uniform.

BRIEF SUMMARY OF THE INVENTION

Exemplary embodiments of the invention provide a backlight assembly capable of stably fixing a light-emitting module, a receiving container and a light guide plate to improve a light efficiency and a uniformity of luminance.

Exemplary embodiments of the invention also provide a method of assembling a backlight assembly capable of easily assembling a light-emitting module, a receiving container and a light guide plate and improving reliability of the assembling.

According to an exemplary embodiment of the invention, a backlight assembly includes a first light-emitting module, a light guide plate, a receiving container and a main adhesion member. The first light-emitting module includes a first circuit board including a first mounting surface, and a first light source on the first mounting surface. The light guide plate is disposed on the first mounting surface and guides light provided from the first light source. The receiving container includes a bottom portion, and receives the first light-emitting module and the light guide plate. The main adhesion member is between the first mounting surface of the first circuit board and the light guide plate, is attached to each of the first circuit board and the light guide plate, and is between the light guide plate and the bottom portion and movable with respect to the light guide plate.

In an embodiment, the backlight assembly may further include a second light-emitting module and a sub adhesion member. The second light-emitting module may be disposed opposite to the first light-emitting module with respect to the light guide plate, and may include second circuit board including a second mounting surface, and a second light source on the second mounting surface, the light guide plate being disposed on the second mounting surface. The sub adhesion member may be between the second mounting surface and the light guide plate and be attached to the second circuit board, and be between the bottom portion and the light guide plate.

In an embodiment, the backlight assembly may further include a reflective sheet. The reflective sheet may be disposed between the bottom portion and the light guide plate. The reflective sheet may include first edge portion, and a second edge portion opposite to the first edge portion. The first edge portion of the reflective sheet may overlap the main adhesion member and the second edge portion may overlap the sub adhesion member.

In an embodiment, the backlight assembly may further include a white printed pattern on the first mounting surface which overlaps the light guide plate.

In an embodiment, the first circuit board further includes an opposite surface to the first mounting surface, wherein the opposite surface faces an inner surface of the bottom portion of the receiving container, and the main adhesion member may be attached to the inner surface of the bottom portion.

According to an exemplary embodiment of the invention, a backlight assembly includes a first light-emitting module, a second light-emitting module, a light guide plate, a main adhesion member, a reflective sheet and a sub adhesion member. The first light-emitting module includes a first circuit board including a first mounting surface, and a first light source on the first mounting surface. The second light-emitting module faces the first light-emitting module and includes a second circuit board including a second mounting surface, and a second light source on the second mounting surface. The light guide plate includes opposing first and second light incident surfaces respectively overlapping the first circuit board and the second circuit board. The main adhesion member is attached to the first circuit board and a first edge portion of the light guide plate. The reflective sheet is disposed under the light guide plate. An edge portion of the reflective sheet contacts the main adhesion member. The sub adhesion member contacts a second edge portion of the light guide plate, and is attached to the reflective sheet.

In an embodiment, the reflective sheet may contact a base film of the main adhesion member. In addition, the light guide plate may contact a base film of the sub adhesion member.

In an embodiment, the backlight assembly may further include a receiving container. The receiving container may include a bottom portion, and receive the first and second light-emitting modules, the light guide plate and the reflective sheet. A first surface of the main adhesion member between the bottom portion and the light guide plate may be attached to the bottom portion, and a second surface opposing the first surface and facing the reflective sheet, is movable with respect to the reflective sheet.

According to an exemplary embodiment of the invention, a backlight assembly includes a first light-emitting module, a light guide plate, a receiving container and a main adhesion member. The first light-emitting module includes a first circuit board including a first mounting surface, and a first light source on the first mounting surface. The light guide plate overlaps the first mounting surface and guides a light from the first light source. The receiving container includes a bottom portion, and receives the first light-emitting module and the light guide plate. The main adhesion member includes a first portion, a second portion and a stepped portion. The first portion is disposed between the first mounting surface and the light guide plate, and the second portion is disposed on the bottom portion. The stepped portion connects the first and second portions to each other.

In an embodiment, the backlight assembly may further include a second light-emitting module, a sub adhesion member and a reflective sheet. The second light-emitting module may be disposed opposite to the first light-emitting module with respect to the light guide plate, and may include a second circuit board including a second mounting surface, and a second light source on the second mounting surface. The light guide plate may be disposed on the second mounting surface. The sub adhesion member may include a stepped portion which is defined by a first portion, and a second portion connected to the first portion. The first portion may be disposed between the second mounting surface and the light guide plate, and the second portion may be disposed on the bottom portion. The reflective sheet may be attached to the second portion of the sub adhesion member.

According to an exemplary embodiment of the invention, there is provided a method of assembling a backlight assembly. In the method, a main adhesion member is attached to a first light-emitting module, and a sub adhesion member is attached to a second light-emitting module. The first light-emitting module and the second light-emitting module are disposed on a bottom portion of a receiving container such that the second light-emitting module faces the first light-emitting module. A reflective sheet is disposed on the bottom portion such that a first portion of the reflective sheet makes contact with the main adhesion member facing the bottom portion, and a second portion opposite to the first portion of the reflective sheet makes contact with the sub adhesion member facing the bottom portion. The guide plate is disposed on the bottom portion on which the reflective sheet is disposed such that each of opposing light incident portions of the light guide plate respectively overlap with mounting surfaces of the circuit boards, thereby attaching the light guide plate to the main adhesion member.

In an embodiment, an edge portion of the light guide plate may be disposed on the second mounting surface in a receiving space of the receiving container, while an opposite edge portion of the light guide plate is at an outside of the receiving container. The opposite edge portion of the light guide plate may be pressed from the outside of the receiving container to the receiving space. The opposite edge portion of the light guide plate may be disposed on the first mounting surface.

According to the invention, a light guide plate is stably fixed to a light-emitting module and a receiving container so that a distance between the light guide plate and the light-emitting module may be uniformly maintained. In addition, although the light guide plate is thermally expanded by heat from the light-emitting module, the other elements included in the backlight assembly may shift so that the distance between the light guide plate and the light-emitting module may be not changed. Accordingly, the other elements included in the backlight assembly may be hardly deformed by an expansion of the light guide plate, for example, a sheet warpage may be minimized. Thus, a light is hardly lost by a change of the distance between the light guide plate and the light-emitting module, so that the backlight assembly may have better light efficiency and better luminance uniformity.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "above," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
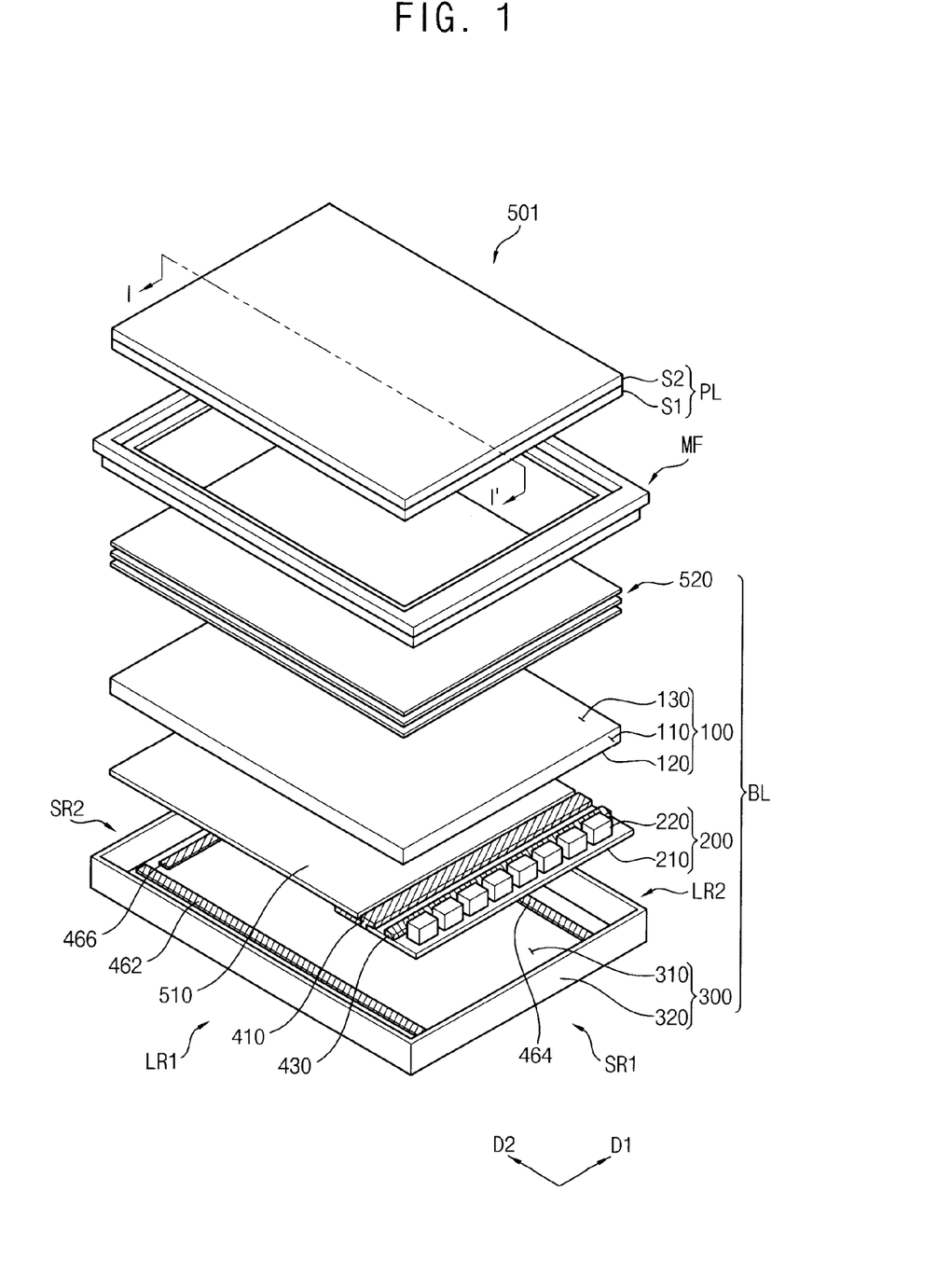
FIG. 1 is an exploded perspective view illustrating an exemplary embodiment of a display apparatus according to the invention.
Figure 2:
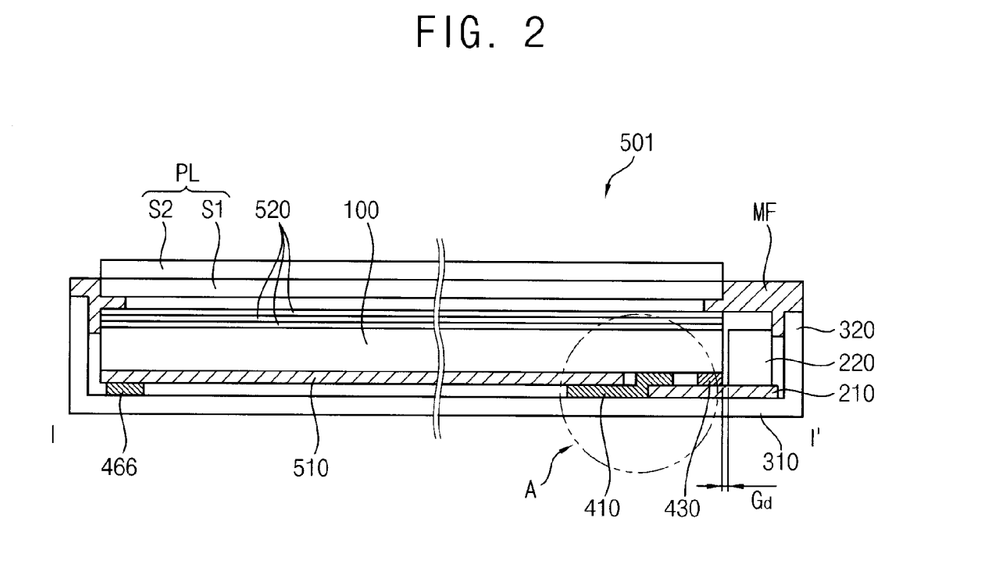
FIG. 2 is a cross-sectional view taken along line I-I' of FIG. 1.

FIG. 1 is an exploded perspective view illustrating an exemplary embodiment of a display apparatus according to the invention, and FIG. 2 is a cross-sectional view taken along line I-I' of FIG. 1.

Referring to FIGS. 1 and 2, a display apparatus 501 includes a display panel PL and a backlight assembly BL. The backlight assembly BL is disposed under and overlaps the display panel PL to provide light used for displaying an image to the display panel PL.

The display panel PL includes a first display substrate S1, a second display substrate S2 and a liquid crystal layer (not shown) between the first and second display substrates S1 and S2. Liquid crystal molecules of the liquid crystal layer may control a transmittance of light provided from the backlight assembly BL to display the image. The first display substrate S1 may include a data line (not shown) longitudinally extending in a first direction D1, and a gate line (not shown) crossing the data line and longitudinally extending in a second direction D2.

A relatively shorter side of the display panel PL is defined as a side extending along the first direction D1 and a relatively longer side of the display panel PL longer than the relatively shorter side is defined as a side extending along the second direction D2. Hereinafter, both side portions of the display apparatus 501 corresponding to a relatively shorter side area of the display panel PL are referred to as a "first shorter side part SR1" and a "second shorter side part SR2", respectively. In addition, both side portions of the display apparatus 501 corresponding to a relatively longer side area of the display panel PL are referred to as a "first longer side part LR1" and a "second longer side part LR2," respectively.

The backlight assembly BL includes a light guide plate 100, a light-emitting module 200, a receiving container 300, a main adhesion member 410, an adhesive member 430, a reflective sheet 510 and optical sheets 520. The light guide plate 100, the light-emitting module 200, the reflective sheet 510 and the optical sheets 520 are received in a receiving space of the receiving container 300. The receiving space is defined by a bottom portion 310, and sidewalls 320 connected to the bottom portion 310.

The light guide plate 100 includes an incident surface 110, a light guiding surface 120 and a light exiting surface 130.

The incident surface 110 is a surface of the light guide plate 100 facing the light-emitting module 200. A light generated from the light-emitting module 200 is provided to an inside of the light guide plate 100 through the incident surface 110. The incident surface 110 is spaced apart from the light-emitting module 200 along the second direction D2 by a predetermined distance $G_d$. Light efficiency may increase as the distance $G_d$ between the incident surface 110 and a light source 220 decreases. However, the distance $G_d$ should be uniformly maintained to minimize a loss of light provided from the light source 220 once the backlight assembly BL is completely assembled.

The light guide surface 120 is a surface of the light guide plate 100 connected to the incident surface 110 and facing the bottom portion 310. Although not shown in figures, a diffusing pattern is on the light guide surface 120. The light guide surface 120 faces the reflective sheet 510 disposed between the bottom portion 310 and the light guide plate 100. A light passing through the incident surface 110 is refracted and/or diffused on the light guide surface 120, actually on the diffusing pattern of the light guide surface 120, and is reflected by the reflective sheet 510 so that a light pathway is changed toward the display panel PL.

The light exiting surface 130 is a surface of the light guide plate 100 through which a light provided to the inside of the light guide plate 100 exits from the light guide plate 100. The light exiting surface 130 is connected to the incident surface 110 and is an opposite surface to the light guide surface 120.

The light-emitting module 200 includes a circuit board 210 and the light source 220. The light-emitting module 200 is disposed at the first shorter side part SR1.

The light source 220 substantially generates light and is on the circuit board 210 and in electrical connection with a circuit on a base substrate of the circuit board 210. The light source 220 includes a plurality of light-emitting diodes ("LEDs").

The circuit board 210 may be in physical and/or electrical connection to a light source driving part (not shown), or be electrical connection to the display panel PL. An edge portion of the light guide plate 100 is disposed on the circuit board 210 so that the circuit board 210 partially overlaps with the edge portion of the light guide plate 100. The circuit board 210 may include a flexible printed circuit board ("FPCB") of which the base substrate is a flexible film.

A white printed pattern (not shown) may be on a mounting surface 212 (Refer to FIG. 3) which includes the light source 220 thereon, of the circuit board 210. The white printed pattern may be on the mounting surface 212 in a region overlapping with the circuit board 210 and the light guide plate 100. The white printed pattern diffuses light to prevent a light luminance from being decreased in the light guide surface 120 which overlaps with the mounting surface 212, compared to the other region.

The main adhesion member 410 is between the circuit board 210 and the light guide plate 100 and is between the light guide plate 100 and the bottom portion 310. The main adhesion member 410 is disposed at the first shorter side part SR1 and between the light guide plate 100 of the first shorter side part SR1 and the circuit board 210, thereby being attached to the circuit board 210 and the light guide plate 100. The light guide plate 100 is fixedly attached by the main adhesion member 410 near a spaced region of the distance $G_d$ of the circuit board 210 from the light source 220.

The mounting surface 212 including the light source 220 mounted thereon of the circuit board 210 is attached to the light guide surface 120 of the light guide plate 100 by the main adhesion member 410. In addition, the main adhesion member 410 is partially attached to an inner surface 312 (Refer to FIG. 3) at the receiving space side, of the bottom portion 310. Thus, the main adhesion member 410 which fixes the circuit board 210 and the light guide plate 100 to each other, is also attached to the bottom portion 310. An edge portion of the reflective sheet 510 is disposed on a portion of the main adhesion member 410 attached to the bottom portion 310.

The adhesive member 430 is disposed between the light source 220 and an edge portion of the main adhesion member 410 on the circuit board 210. The adhesive member 430 is between the circuit board 210 and the light guide plate 100 to further attach the circuit board 210 to the light guide plate 100. The adhesive member 430 attaches the circuit board 210 to the light guide plate 100, in addition to the main adhesion member 410 attaching the circuit board 210 to the light guide plate 100.

The backlight assembly BL further includes a first fixing tape 462, a second fixing tape 464 and a third fixing tape 466. Each of the first, second and third fixing tapes 462, 464 and 466 may include a double-sided tape having an adhesive layer on both of opposing sides of a base film.

The first fixing tape 462 and the second fixing tape 464 are respectively disposed at both of opposing side portions which are the relatively longer sides of the display panel PL. As in the illustrated embodiment, for example, the first fixing tape 462 is disposed at the first longer side part LR1 and the second fixing tape 464 is disposed at the second longer side part LR2. The first fixing tape 462 is between an edge portion of the light guide plate 100 and the bottom portion 310 at the first longer side part LR1. The second fixing tape 464 is between an edge portion of the light guide plate 100 and the bottom portion 310 at the second longer side part LR2. Thus, the first and second fixing tapes 462 and 464 may fix both of opposing edge portions of the light guide plate 100 adjacent to the first and second longer side parts LR1 and LR2, respectively, to the bottom portion 310.

The third fixing tape 466 is disposed on the bottom portion 310 at the second shorter side part SR2. The third fixing tape 466 is between the bottom portion 310 and the reflective sheet 510 to fix a portion of the reflective sheet 510 to the bottom portion 310. A first portion of the reflective sheet 510 adjacent to the first shorter side part SR1 is disposed on the main adhesion member 410, and a second portion of the reflective sheet 510 adjacent to the second shorter side part SR2 is on the third fixing tape 466.

The optical sheets 520 are disposed on the light guide plate 100 and efficiently provide light exiting from the light guide plate 100 to the display panel PL. The optical sheets 520 may include a diffusing sheet, a prism sheet, etc.

A mold frame MF is disposed between the backlight assembly BL and the display panel PL. The mold frame MF fixes the backlight assembly BL to the receiving container 300 and supports the display panel PL.

Although not shown in figures, a converter in electrical connection to the light-emitting module 200 may be disposed on an outer surface 314 (Refer to FIG. 3) facing the inner surface 312 of the receiving container 300.

Hereinafter, each structure of the main adhesion member 410 and the adhesive member 430, and a combined relation between the light guide plate 100, the light-emitting module 200 and the receiving container 300 will be illustrated in detail referring to FIG. 3 with FIGS. 1 and 2.

Figure 3:
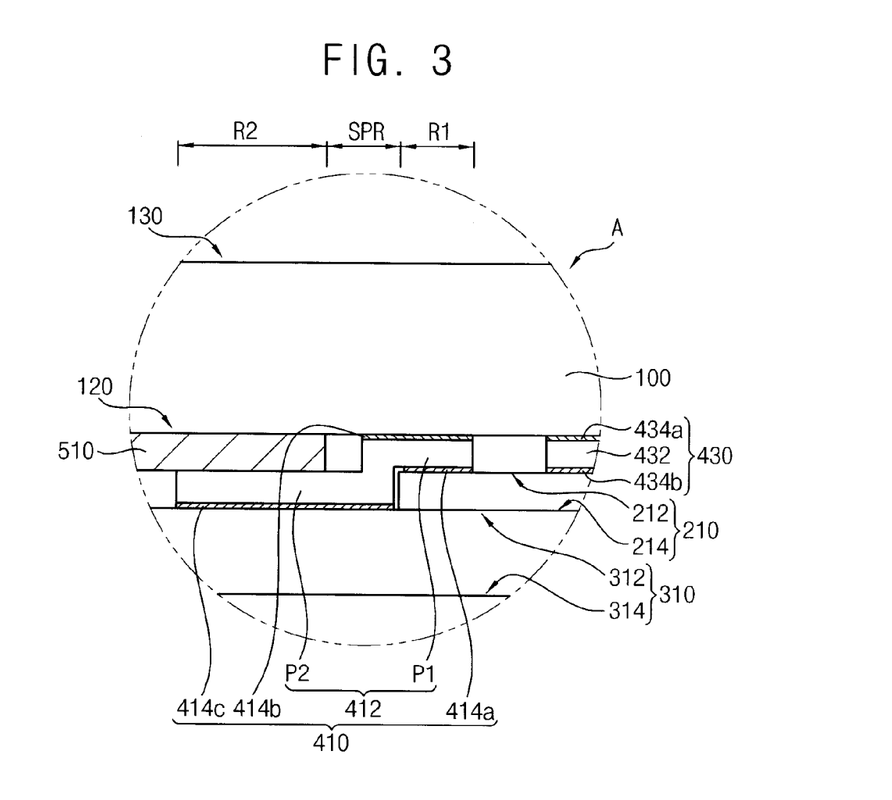
FIG. 3 is an enlarged cross-sectional view illustrating portion "A" of FIG. 2.

FIG. 3 is an enlarge cross-sectional view of portion "A" in FIG. 2.

Referring to FIG. 3 with FIGS. 1 and 2, the main adhesion member 410 includes a base film 412, a first adhesive pattern 414a, a second adhesive pattern 414b and a third adhesive pattern 414c. The main adhesion member 410 is a single, unitary, indivisible member.

The base film 412 is a frame of the main adhesion member 410 and is divided into a first film portion P1 and a second film portion P2. The first film portion P1 is a portion of the base film 412 between the circuit board 210 and the light guide plate 100. The second film portion P2 is extended from the first film portion P1 and between the light guide plate 100 and the bottom portion 310.

Since the circuit board 210 has a predetermined thickness, the mounting surface 212 of the circuit board 210 is spaced apart from the inner surface 312 of the bottom portion 310 by a predetermined distance. By the thickness of the circuit board 210, a stepped portion is formed between the inner surface 312 of the bottom portion 310 and the mounting surface 212 of the circuit board 210. Thus, with respect to the inner surface 312 of the bottom portion 310, the first film portion P1 is disposed higher than the second film portion P2 to form the stepped portion between the first and second film portions P1 and P2. The second film portion P2 is disposed in a low region with respect to the thickness of the circuit board 210 compared to the first film portion P1, so that a space accommodating the reflective sheet 510 may be guaranteed on the second film portion P2. Therefore, an increased thickness of a region overlapping with the reflective sheet 510 and the main adhesion member 410 compared to other regions may be reduced or effectively prevented.

When a portion of the main adhesion member 410 between the circuit board 210 and light guide plate 100 is defined as a "first region portion R1," the first film portion P1 is a portion of the base film 412 corresponding to the first region portion R1. In addition, when a portion of the main adhesion member 410 between the bottom portion 310 and the reflective sheet 510 is defined as a "second region portion R2," the second film portion P2 is a portion of the based film 412 corresponding to the second region portion R2. The first and second region portions R1 and R2 form a stepped portion SPR of the main adhesion member 410. The first and second region portions R1 and R2 are disposed at positions having different heights from each other to form the stepped portion SPR with respect to the bottom portion 310. By the stepped portion SPR, the reflective sheet 510 is disposed on the second region portion R2 of the main adhesion member 410 which is lower than the first region portion R1 of the main adhesion member 410, to minimize an increase of a thickness of the backlight assembly 510 due to the reflective sheet 510.

The first portion of the reflective sheet 510 is spaced apart from the bottom portion 310 by a thickness of the main adhesion member 410, and the second portion of the reflective sheet 510 is disposed on the third fixing tape 466 so that the reflective sheet 510 may be entirely disposed substantially parallel with the bottom portion 310 and facing the bottom portion 310. The third fixing tape 466 compensates for a position of the second portion of the reflective sheet 510 due to the thickness of the main adhesion member 410.

The first adhesive pattern 414a is disposed between the first film portion P1 and the circuit board 210. The first adhesive pattern 414a is in the first region portion R1 of the main adhesion member 410. In addition, the first adhesive pattern 414a may be partially in the stepped portion SPR of the main adhesion member 410. The first adhesive pattern 414a is disposed on the mounting surface 212 including the light source 220 thereon of the circuit board 210 and is attached to the circuit board 210. An opposing surface 214 to the mounting surface 212 faces the inner surface 312 of the bottom portion 310. The second adhesive pattern 414b is disposed between the first film portion P1 and the light guide plate 100.

The second adhesive pattern 414b is between the first film portion P1 and the light guide surface 120 and is attached to the light guide plate 100. The second adhesive pattern 414b is disposed in an entire of the first region portion R1 and is partially disposed in the stepped portion SPR. The circuit board 210 and the light guide plate 100 are attached to each other by the main adhesion member 410 between the mounting surface 212 and the light guide surface 120.

The third adhesive pattern 414c is disposed between the second film portion P2 and the bottom portion 310. The third adhesive pattern 414c is disposed in an entire of the second region portion R2 and is partially disposed in the stepped portion SPR. The inner surface 312 is attached to the base film 412 by the third adhesive pattern 414c. In the illustrated embodiment, for example, the light guide plate 100 attached to the circuit board 210 by the first and second adhesive patterns 414a and 414b is further fixed on the bottom portion 310 by the third adhesive pattern 414c. The reflective sheet 510 is disposed on an opposite surface of a surface of the second film portion P2 to which the third adhesive pattern 414c is attached. The opposite surface of the second film portion P2 directly makes contact with the reflective sheet 510 so that the reflective sheet 510 is movable with respect to the main adhesion member 410 and is merely disposed on the main adhesion member 410. That is, the reflective sheet 510 is not attached to the main adhesion member 410.

The adhesive member 430 includes a base layer 432, a first adhesive layer 434a on a first surface of the base layer 432, and a second adhesive layer 434b on an opposite second surface of the base layer 432 on which the first adhesive layer 434a is formed. The light guide plate 100 is connected to the base layer 432 by the first adhesive layer 434a, and the second adhesive layer 434b attached to the base layer 432 is attached to the circuit board 210 so that the light guide plate 100 and the circuit board 210 are attached to each other by the adhesive member 430. Alternatively, an adhesive material may be coated on the circuit board 210 and then the adhesive material may be hardened after the light guide plate 100 is disposed on the circuit board 210 including the adhesive material, thereby forming the adhesive member 430 including a single adhesive layer connecting the circuit board 210 to the light guide plate 100.

Although the light guide plate 100 is expanded by heat emitting from the light module 200 so that the light guide plate 100 may be deformed, the distance $G_d$ between the incident surface 110 and the light source 220 may be uniformly maintained since the light guide plate 100, the circuit board 210 and the receiving container 300 are connected to each other together by the single main adhesion member 410. Although the light guide plate 100 expands in the second direction D2, the first shorter side part SR1 is a "fixed axis" for the second direction D2 with respect to the light guide plate 100, so that the distance $G_d$ is not changed since the adhesive member 430 is further between the light guide plate 100 and the circuit board 210.

However, since the reflective sheet 510 is merely attached to the receiving container 300 at the second shorter side part SR2, the second shorter side part SR2 is a "floating axis" for the second direction D2 with respect to the light guide plate 100. Thus, the floating axis is changed due to the expansion of the light guide plate 100 in the second direction D2. Both edge portions of the light guide plate 100 adjacent to the first and second longer side parts LR1 and LR2 are fixed by the first and the second adhesive tapes 462 and 464.

According to the above-mentioned descriptions, the light guide plate 100 is stably fixed to the light-emitting module 200 and the receiving container 300 so that the distance $G_d$ between the light guide plate 100 and the light-emitting module 200 may be uniformly maintained.

Simultaneously, although the light guide plate 100 expands, the light guide plate 100 at the first shorter side part SR1 is fixed, the light guide plate 100 at the second shorter side part SR2 is not fixed (e.g., movable), the reflective sheet 510 at the second shorter side part SR2 is fixed, and the reflective sheet 510 at the first shorter side part SR1 is not fixed, so that the reflective sheet 510 is not shifted with the light guide plate 100 to minimize a sheet warpage of the reflective sheet 510 due to an expansion of the light guide plate 100.

Figure 4:
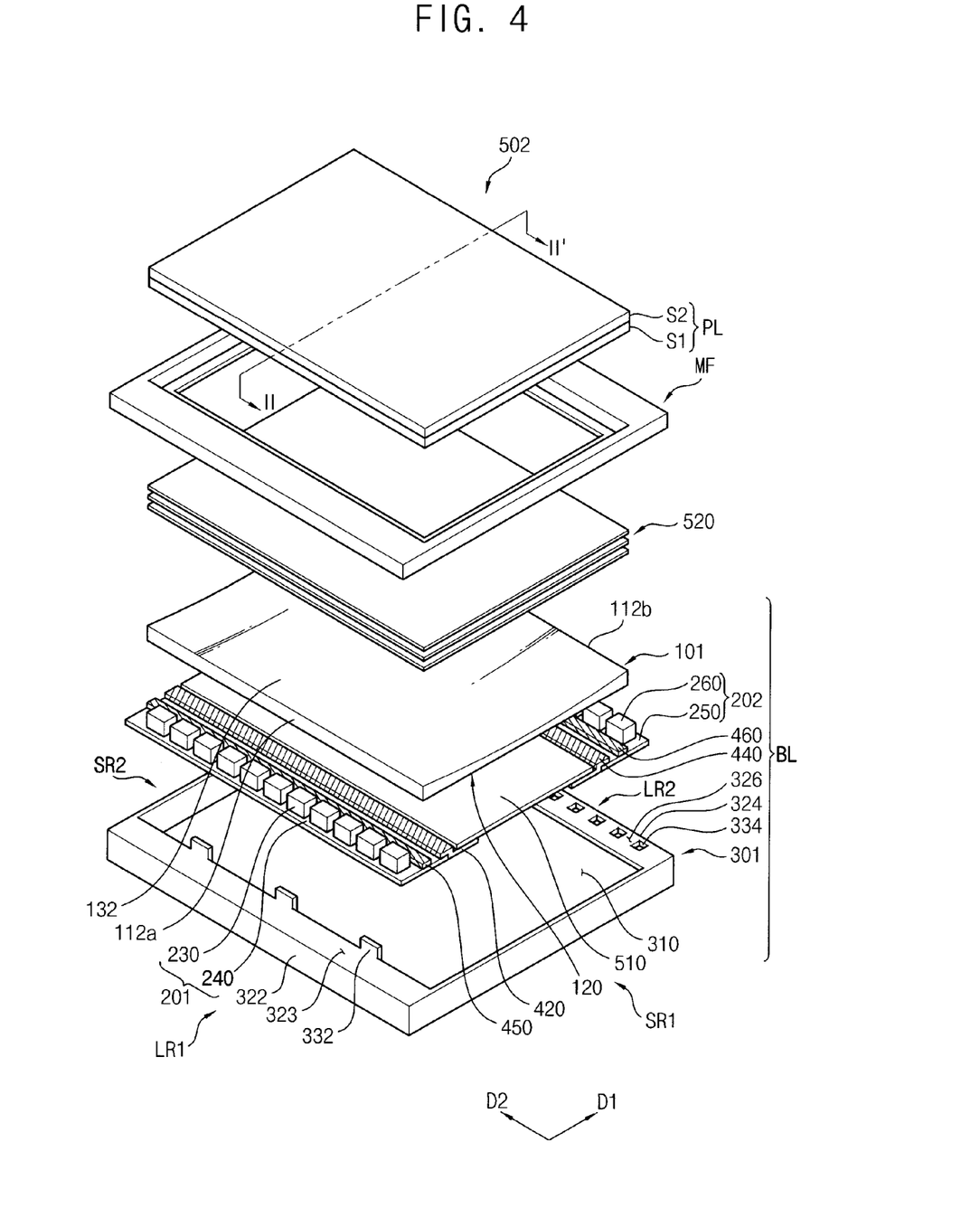
FIG. 4 is an exploded perspective view illustrating another exemplary embodiment of a display apparatus according to the invention.
Figure 5:
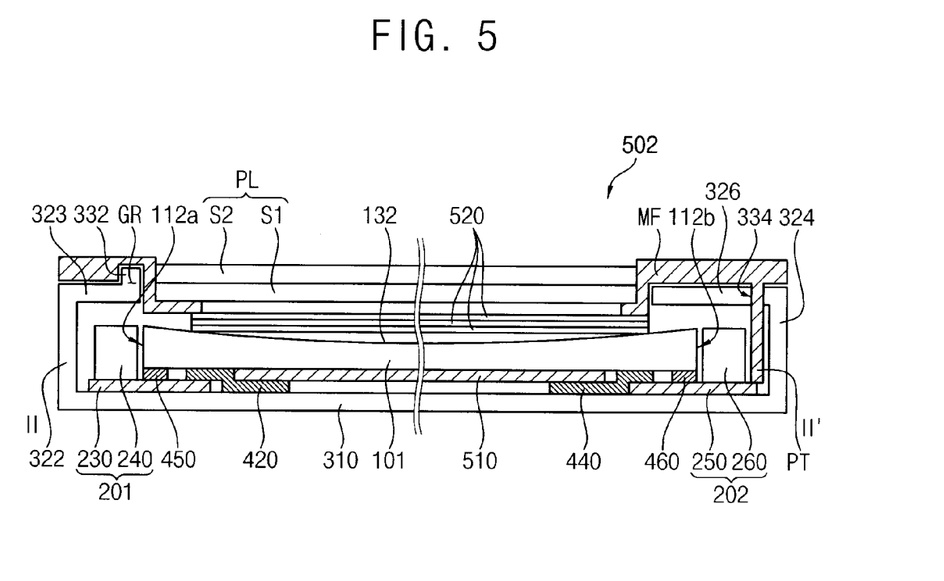
FIG. 5 is a cross-sectional view taken along line II-IF of FIG. 4.

FIG. 4 is an exploded perspective view illustrating another exemplary embodiment of a display apparatus according to the invention, and FIG. 5 is a cross-sectional view taken along line II-II' of FIG. 4.

Referring to FIGS. 4 and 5, a display apparatus 502 includes the display panel PL and the backlight assembly BL. The display panel PL according to the illustrated exemplary embodiment is substantially the same as the display panel PL illustrated in FIGS. 1 and 2, and thus any repetitive description will be omitted. Hereinafter, the backlight assembly BL shown in FIGS. 4 and 5 will be illustrated in detail.

The backlight assembly BL includes a light guide plate 101, a first light-emitting module 201, a second light-emitting module 202, a receiving container 301, a main adhesion member 420, a sub adhesion member 440, a first adhesive member 450, a second adhesive member 460, the reflective sheet 510 and the optical sheets 520. The main adhesion member 420 and the sub adhesion member 440 are each a single, unitary, indivisible member. The backlight assembly BL further includes the mold frame ML combined with the receiving container 301.

The light guide plate 101 includes a first incident surface 112a, a second incident surface 112b, the light guide surface 120 and a light exiting surface 132.

The first incident surface 112a is a surface of the light guide plate 101 facing the first light-emitting module 201. A light generated from the first light-emitting module 201 passes through the first incident surface 112a and is provided to an inside of the light guide plate 101. The second incident surface 112b is a surface of the light guide plate 101 opposing the first incident surface 112a. The second incident surface 112b faces the second light-emitting module 202. A light generated from the second light-emitting module 202 passes through the second incident surface 112b and is provided to the light guide plate 101.

The light guide surface 120 is connected to the first and second incident surfaces 112a and 112b, and light provided through the first and second incident surfaces 112a and 112b is refracted and/or diffused so that a light pathway is changed toward the display panel PL. A light passing through the light guide surface 120 is reflected by the reflective sheet 510 disposed under the light guide surface 120 and advances toward the display panel PL.

The light exiting surface 132 is an opposite surface to the light guide surface 120 and light exits from the inside of the light guide plate 101 to an outside through the light exiting surface 132. A distance between the light exiting surface 132 and the light guide surface 120 is decreased from each of a first longer side part LR1 and a second longer side part LR2 of the display apparatus 502 toward a central portion of the light exiting surface 132 so that the light exiting surface 132 has a curvature. When viewed in a cross-sectional structure of the light guide plate 101, a thickness of the light guide plate 101 is decreased from the first longer side part LR1 toward the central portion and is increased from the central portion toward the second longer side part LR2. The light exiting surface has a concave shape caved in toward the light guide surface 120 to improve a light exiting efficiency and to decrease the thickness of the light guide plate 101 in a region in which the optical sheets 520 are disposed, so that an entire thickness of the backlight assembly BL may be decreased.

Alternatively, the distance between the light exiting surface 132 and the light guide surface 120 is decreased from each of the first and second longer side parts LR1 and LR2 toward the central portion so that the light exiting surface 132 has a curvature, and the distance is simultaneously decreased from each of a first shorter side part SR1 and a second shorter side part SR2 toward the central portion. Then, the light exiting surface 132 may have a concave shape, which means that the thickness of the light guide plate 101 is decreased from four vertexes to a central point of the light guide plate 101. Alternatively, the light exiting surface 132 may be substantially parallel with the light guide surface 120.

The first light-emitting module 201 includes a first light source 240 facing the first incident surface 112a and a first circuit board 230 including the first light source 240 thereon. The first light source 240 includes a light-emitting diode ("LED"). The first light-emitting module 201 is disposed at the first longer side part LR1. A portion of the light guide plate 101 parallel to the first longer side part LR1 partially overlaps with the first circuit board 230.

The second light-emitting module 202 includes a second light source 260 facing the second incident surface 112b and a second circuit board 250 including the second light source 260 thereon. The second light-emitting module 202 is disposed in a first direction D1 of the first light-emitting module 201. The second light source 260 includes an LED. The second light-emitting module 202 is at the second longer side part LR2.

The receiving container 301 includes the bottom portion 310, a first sidewall 322 and a second sidewall 324. The receiving container 301 further includes a first supporting portion 323 and a second supporting portion 326. An opposite portion of the light guide plate 101 parallel to the second longer side part LR2 partially overlaps with the second circuit board 250.

The bottom portion 310 faces the light guide surface 120 and forms a receiving space of the receiving container 301 with the first and second sidewalls 322 and 324. The light guide plate 101, and the first and second light-emitting modules 201 and 202 are disposed on the inner surface 312 (Refer to FIG. 6A) of the bottom portion 310 toward the receiving space.

The first sidewall 322 is disposed adjacent to the first longer side part LR1 and the first supporting portion 323 is connected to the first sidewall 322. The first supporting portion 323 faces the bottom portion 310, and the first sidewall 322, the first supporting portion 323 and a portion of the bottom portion 310 surrounds the first light-emitting module 201 so that the first light-emitting module 201 is received in the receiving container 301. The first supporting portion 323 is connected to a protrusion 332 which extends in an upper direction toward the display panel PL. The receiving container 301 and the mold frame MF are connected to each other by the protrusion 332 at the first longer side part LR1.

The second sidewall 324 is disposed adjacent to the second longer side part LR2 and the second supporting portion 326 is connected to the second sidewall 324. The second supporting portion 326 faces the bottom portion 310, and the second sidewall 324, the second supporting portion 326 and a portion of the bottom portion 310 surrounds the second light-emitting module 202 so that the second light-emitting module 202 is received in the receiving container 301. The bottom portion 310, the first sidewall 322, the second sidewall 324, the first supporting portion 323, the second supporting portion 326 and the protrusion 332 collectively form a single, unitary, indivisible member. A through hole 334 extends through a thickness of the second supporting portion 326. The receiving container 301 and the mold frame MF are connected to each other by the through hole 334 at the second longer side part LR2. A portion of the mold frame MF extends completely through the through hole 334 to couple the receiving container 301 and the mold frame MF to each other.

The main adhesion member 420 is between the first circuit board 230 and the light guide plate 101 to attach the first circuit board 230 and the light guide plate 101 to each other, and is between the light guide plate 101 and the bottom portion 310 to further fix the first circuit board 230 and the light guide plate 101 which are attached to each other, to the bottom portion 310.

The sub adhesion member 440 is between the second circuit board 250 and the light guide plate 101 to attach the second circuit board 250 and the light guide plate 101 to each other, and is between the bottom portion 310 and the light guide plate 101. The sub adhesion member 440 is attached to the reflective sheet 510 and is movable with respect to the light guide plate 101. That is, the sub adhesion member 440 may not be attached to the light guide plate 101.

The first adhesive member 450 is between the first circuit board 230 and the light guide plate 101 to attach the first circuit board 230 to the light guide plate 101 along with the main adhesion member 420. The first adhesive member 450 is spaced apart from the main adhesion member 420 and disposed between the first light source 240 and the main adhesion member 420 in the first direction D1.

The second adhesive member 460 is between the second circuit board 250 and the light guide plate 101 to attach the second circuit board 250 to the light guide plate 101 along with the sub adhesion member 440. The second adhesive member 460 is spaced apart from the sub adhesion member 440 and disposed between the second light source 260 and the sub adhesion member 440 in the first direction D1.

The main adhesion member 420, the sub adhesion member 440, and the first and second adhesive members 450 and 460 will be later explained in detail referring to FIGS. 6A and 6B.

The reflective sheet 510 is disposed between the light guide plate 101 and the bottom portion 310. The reflective sheet 510 partially overlaps with each of the main and sub adhesion members 420 and 440. A first portion of the reflective sheet 510 adjacent to the first longer side part LR1 partially overlaps with the main adhesion member 420 and a second portion of the reflective sheet 510 adjacent to the second longer side part LR2 partially overlaps with the sub adhesion member 440.

The optical sheets 520 are substantially the same as illustrated in FIGS. 1 and 2, and thus any repetitive descriptions will be omitted.

The mold frame MF includes a groove GR in a sidewall corresponding to the protrusion 332 of the receiving container 301 and a combining protrusion PT in a sidewall corresponding to the through hole 334 of the receiving container 301. The protrusion 332 is inserted into the groove GR to combine the mold frame MF at the first longer side part LR1 with the receiving container 301. The combining protrusion PT is inserted into the through hole 334 to combine the mold frame MF at the second longer side part LR2 with the receiving container 301.

Figure 6A:
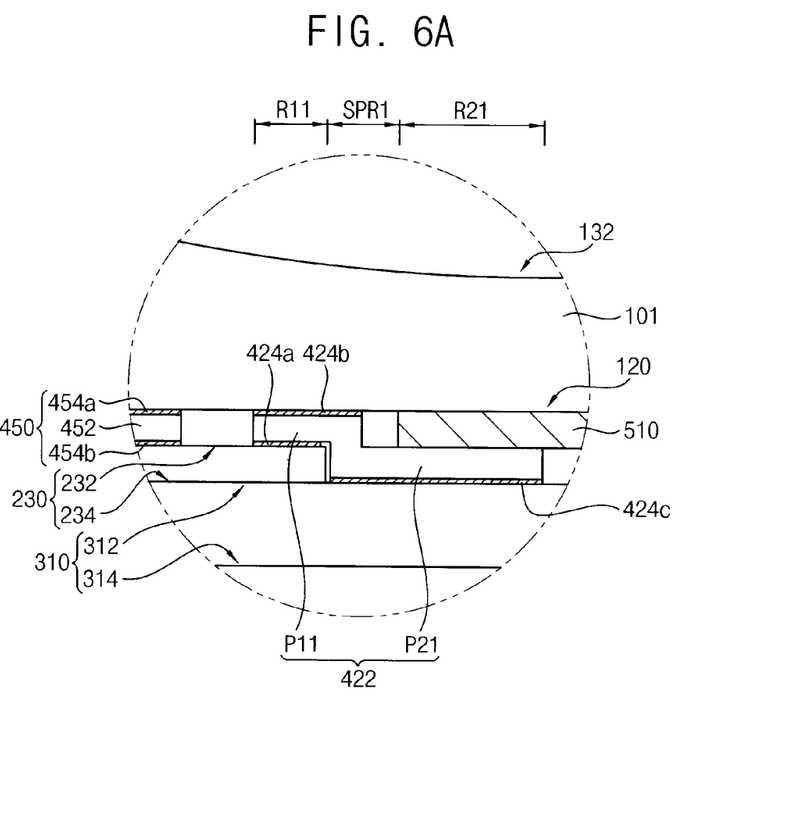
FIG. 6A is an enlarged cross-sectional view illustrating a relation between a light guide plate, a main adhesion member and a first circuit board shown in FIG. 5.

FIG. 6A is an enlarged cross-sectional view illustrating a relation between the light guide plate 101, the main adhesion member 420 and the first circuit board 230 shown in FIG. 5.

Referring to FIG. 6A, the main adhesion member 420 includes a first base film 422, a first adhesive pattern 424a, a second adhesive pattern 424b and a third adhesive pattern 424c.

The first base film 422 is a frame of the main adhesion member 420 and is divided into a first film portion P11 and a second film portion P21. The first film portion P11 is a portion of the first base film 422 between the first circuit board 230 and the light guide plate 101. The second film portion P21 is extended from the first film portion P11 and between the light guide plate 101 and the bottom portion 310.

By a thickness of the first circuit board 230, a stepped portion is defined by the inner surface 312 of the bottom portion 310 and a first mounting surface 232 of the first circuit board 230. Thus, the first film portion P11 of the first base film 422 is disposed at a position higher than the second film portion P21 with respect to the inner surface 312 of the bottom portion 310 to define a stepped portion between the first film portion P11 and the second film portion P21. Since the second film portion P21 is disposed at a position lower than the first film portion P11 by the thickness of the first circuit board 230, a space accommodating the reflective sheet 510 may be guaranteed on the second film portion P21. Therefore, an increased thickness of a region overlapping with the reflective sheet 510 and the main adhesion member 410 compared to other regions may be reduced or effectively prevented.

When a portion of the main adhesion member 420 between the first circuit board 230 and light guide plate 101 is defined as a "first region portion R11," the first film portion P11 is a portion of the base film 422 corresponding to the first region portion R11. In addition, when a portion of the main adhesion member 420 between the bottom portion 310 and the reflective sheet 510 is defined as a "second region portion R21," the second film portion P21 is a portion of the base film 422 corresponding to the second region portion R21. The first and second region portions R11 and R21 form a first stepped portion SPR1 of the main adhesion member 420. The first and second region portions R11 and R21 are disposed at positions having different heights from each other to form the first stepped portion SPR1 with respect to the bottom portion 310.

The first adhesive pattern 424a is disposed between the first film portion P11 of the first base film 422 and the first mounting surface 232 including the first light source 240 thereon of the first circuit board 230 and is attached to the first circuit board 230. An opposite surface 234 to the first mounting surface 232 faces the inner surface 312 of the bottom portion 310. The first adhesive pattern 424a is disposed in an entire of the first region portion R11. The first adhesive pattern 424a may be partially disposed in the first stepped portion SPR1.

The second adhesive pattern 424b is between the first film portion P11 of the first base film 422 and the light guide surface 120, and is attached to the light guide plate 101. The first circuit board 230 is attached to the light guide plate 101 by the main adhesion member 420. The second adhesive pattern 424b is disposed in an entire of the first region portion R11 and is partially disposed in the first stepped portion SPR1.

The third adhesive pattern 424c is disposed between the second film portion P21 of the first base film 422 and the bottom portion 310. The third adhesive pattern 424c is disposed in an entire of the second region portion R21 and is partially disposed in the first stepped portion SPR1. The light guide plate 101 attached to the first circuit board 230 by the first and second adhesive patterns 424a and 424b is further fixed to the bottom portion 310 by the third adhesive pattern 424c. The reflective sheet 510 is disposed on an opposite surface of a surface of the second film portion P21 to which the third adhesive pattern 424c is attached. The opposite surface of the second film portion P21 directly makes contact with the reflective sheet 510 so that the reflective sheet 510 is movable with respect to the main adhesion member 420 and is merely disposed on the main adhesion member 420. That is, the reflective sheet 510 may not be attached to the main adhesion member 420. Thus, the reflective sheet 510 directly makes contact with the second film portion P21 of the first base film 422.

The first adhesive member 450 includes a base layer 452, a first adhesive layer 454a on a first surface of the base layer 452, and a second adhesive layer 454b an opposite second surface of the base layer 452 on which the first adhesive layer 454a is formed. The first adhesive member 450 attaches the first circuit board 230 to the light guide plate 101. The first adhesive member 450 may include a single adhesive layer.

The second adhesive member 460 includes a base layer 468, a first adhesive layer 468a on a first surface of the base layer 468, and a second adhesive layer 457b on an opposite second surface of the base layer 468 on which the first adhesive layer 468a is formed. The second adhesive member 460 attaches the second circuit board 250 to the light guide plate 101. The second adhesive member 460 may include a single adhesive layer.

Although the light guide plate 101 is expanded by heat emitting the first light module 201 so that a shape of the light guide plate 101 may be deformed, a distance between the first incident surface 112a and the first light source 240 may be uniformly maintained since the light guide plate 101, the first circuit board 230 and the receiving container 301 are connected to each other together by the single main adhesion member 430. Although the light guide plate 101 expands, the first longer side part LR1 is a "fixed axis" for the first direction D1 with respect to the light guide plate 101 so that the distance between the first incident surface 112a and the first light source 240 is not changed.

Figure 6B:
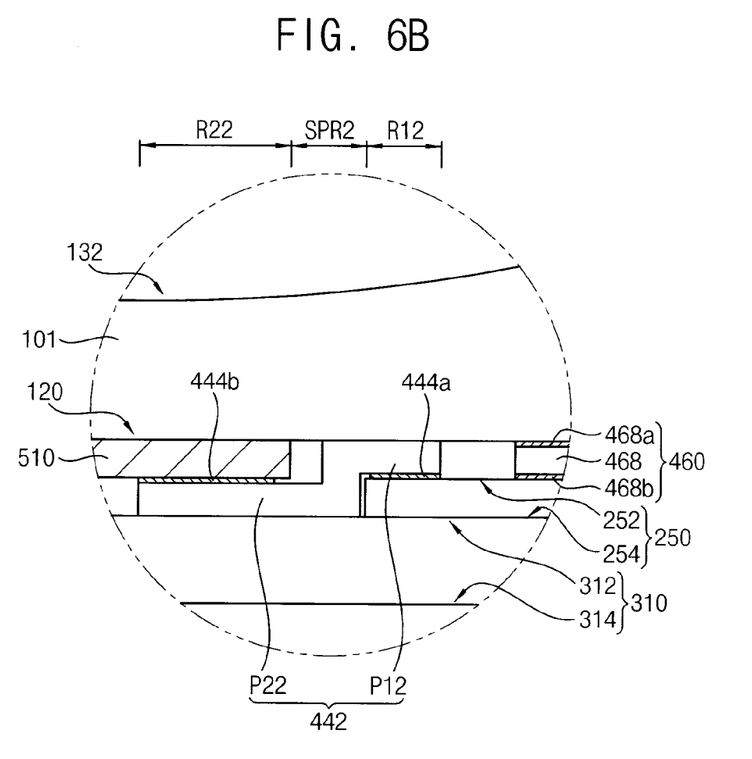
FIG. 6B is an enlarged cross-sectional view illustrating a relation between the light guide plate, a sub adhesion member and a second circuit board shown in FIG. 5.

FIG. 6B is an enlarged cross-sectional view illustrating a relation between the light guide plate 101, the sub adhesion member 440 and the second circuit board 460 shown in FIG. 5.

Referring to FIG. 6B, the sub adhesion member 440 includes a second base film 442, a first adhesive pattern 444a and a second adhesive pattern 444b.

The second base film 442 is divided into a first film portion P12 between a second mounting surface 252 of the second circuit board 250 and the light guide plate 101 and a second film portion P22 extended from the first film portion P12 and between the light guide plate 101 and the bottom portion 310. An opposing surface 254 to the mounting surface 252 faces the inner surface 312 of the bottom portion 310.

By a thickness of the second circuit board 250, a stepped portion is defined by the inner surface 312 of the bottom portion 310 and the second mounting surface 252 of the second circuit board 250. Thus, with substantially the same as a relation between the first circuit board 230 and the main adhesion member 420, a stepped portion is defined between the first film portion P21 of the sub adhesion member 440 and the second film portion P22. Since the second film portion P22 is disposed at a position lower than the first film portion P12 by the thickness of the second circuit board 250, a space accommodating the reflective sheet 510 may be guaranteed on the second film portion P22. Therefore, an increased thickness of a region overlapping with the reflective sheet 510 and the sub adhesion member 440 compared to other regions may be reduced or effectively prevented.

When a portion of the sub adhesion member 440 between the second circuit board 250 and light guide plate 101 is defined as a "first region portion R12," the first film portion P12 is a portion of the base film 442 corresponding to the first region portion R12. In addition, when a portion between the bottom portion 310 and the reflective sheet 510 is defined as a "second region portion R22" of the sub adhesion member 440, the second film portion P22 is a portion of the based film 442 corresponding to the second region portion R22. The first and second region portions R12 and R22 form a second stepped portion SPR2 of the sub adhesion member 440. The first and second region portions R12 and R22 are disposed at positions having different heights from each other to form the second stepped portion SPR2 with respect to the bottom portion 310.

The first portion of the reflective sheet 510 adjacent to the first longer side part LR1 is spaced apart from the bottom portion 310 by the main adhesion member 420 and by the thickness of the main adhesion member 420, and the second portion of the reflective sheet 510 adjacent to the second longer side part LR2 opposing the first portion is disposed on the sub adhesion member 440 so that the reflective sheet 510 may be entirely disposed substantially parallel with the bottom portion 310 and facing the bottom portion 310. The sub adhesion member 440 compensates for a position of the first portion of the reflective sheet 510 by the thickness of the main adhesion member 420. The reflective sheet 510 is disposed in a region between stepped portions defined by the first and second circuit boards 230 and 250 and the bottom portion 310, respectively, so that an increase of the entire thickness of the backlight assembly BL may be reduced or effectively prevented although the main adhesion member 420 and the sub adhesion member 440 are added.

The first adhesive pattern 444a is between the second mounting surface 252 of the second circuit board 250 and the first film portion P12 of the second base film 442. Thus, the second base film 442 is connected to the second circuit board 250. The first film portion P12 of the second base film 442 directly makes contact with the light guide surface 120 so that the sub adhesion member 440 is not attached to the light guide plate 101. That is, the sub adhesion member 440 may be movable with respect to the light guide plate 101.

The second adhesive pattern 444b is between the second film portion P22 of the second base film 442 and the reflective sheet 510 to attach the reflective sheet 510 to the second circuit board 250. In addition, the second film portion P22 of the second base film 442 directly makes contact with the bottom portion 310 so that the sub adhesion member 440 is not attached to the bottom portion 310. That is, the sub adhesion member 440 may be movable with respect to the bottom portion 310.

Therefore, the sub adhesion member 440 attaches the second circuit board 250 to the reflective sheet 510. The second circuit board 250 is merely attached to the reflective sheet 510 at the second longer side part LR2 and is not attached (i.e. movable) to the bottom portion 310 or the light guide plate 101, so that the second longer side part LR2 is a "floating axis" for the first direction D1 for the light guide plate 101 and the floating axis may be shifted by an expansion of the light guide plate 101.

As mentioned above, the light guide plate 101 is stably fixed with the first light-emitting module 201 and the receiving container 301 so that a distance between the light guide plate 101 and the first light-emitting module 201 may be uniformly maintained. Simultaneously, the second light-emitting module 202 is fixed to the light guide plate 101 by the second adhesive member 460 so that a distance between the second light-emitting module 202 and the light guide plate 101 may be uniformly maintained. By the first and second stepped portions SPR1 and SPR2, the thickness of the backlight assembly BL which is increased by the reflective sheet 510, may be minimized.

Although the light guide plate 101 receives heat by the first light-emitting module 201 or the second light-emitting module 202 to expand in the first direction D1, the light guide plate 101 at the first longer side part LR1 is fixed, the light guide plate 101 at the second longer side part LR2 is not fixed (i.e. movable), the reflective sheet 510 at the second longer side part LR2 is fixed, and the reflective sheet 510 at the first longer side part LR1 is not fixed so that the reflective sheet 510 is not shifted along the same direction as the shifting of the light guide plate 101. Thus, a sheet warpage of the reflective sheet 510 due to an expansion of the light guide plate 101 may be minimized.

Hereinafter, referring to FIGS. 7A, 7B and 7C, a method of assembling the backlight assembly BL shown in FIG. 5 includes disposing the first and second light-emitting modules 201 and 202, the reflective sheet 510 and the light guide plate 101 in the receiving container 301.

Figure 7A:
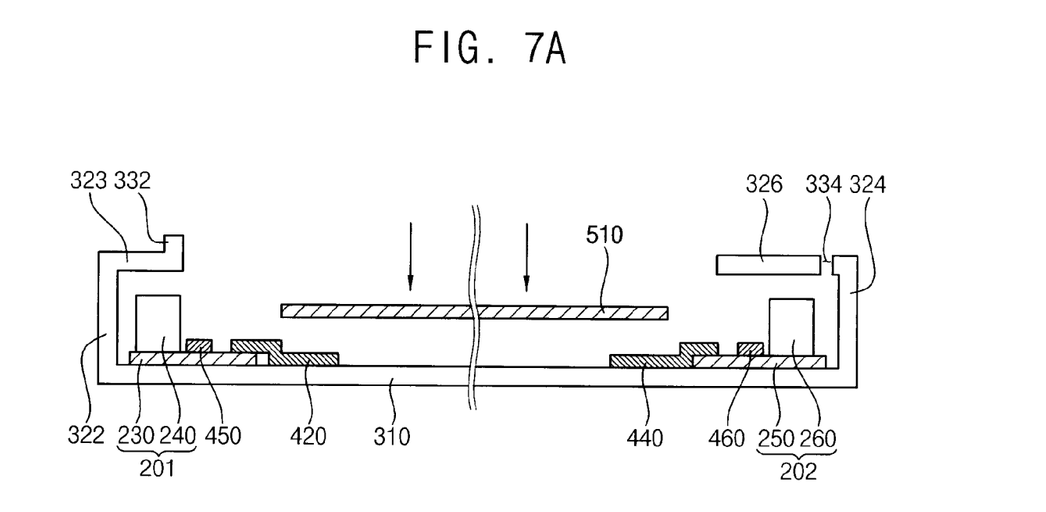
FIGS. 7A, 7B and 7C are cross-sectional views illustrating an exemplary embodiment of a method of assembling the backlight assembly shown in FIG. 5.
Figure 7B:
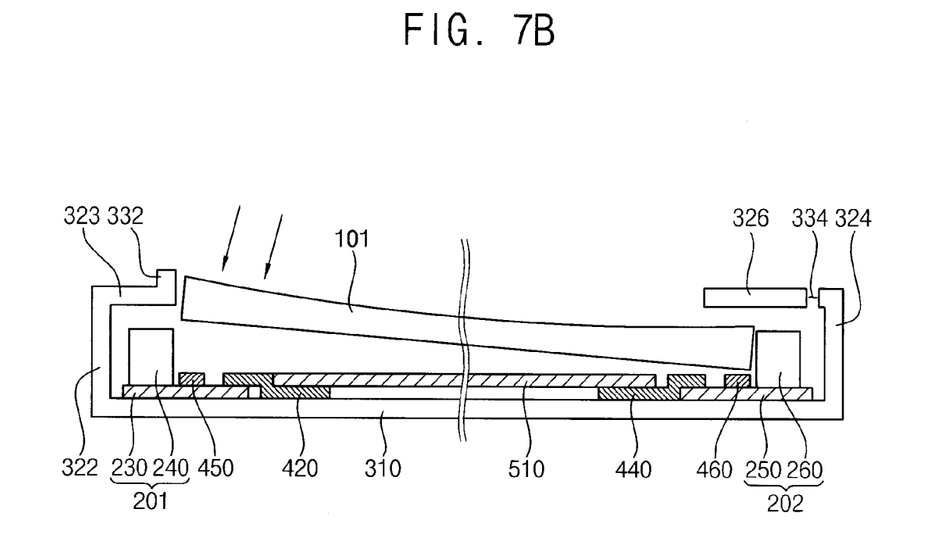
Figure 7C:
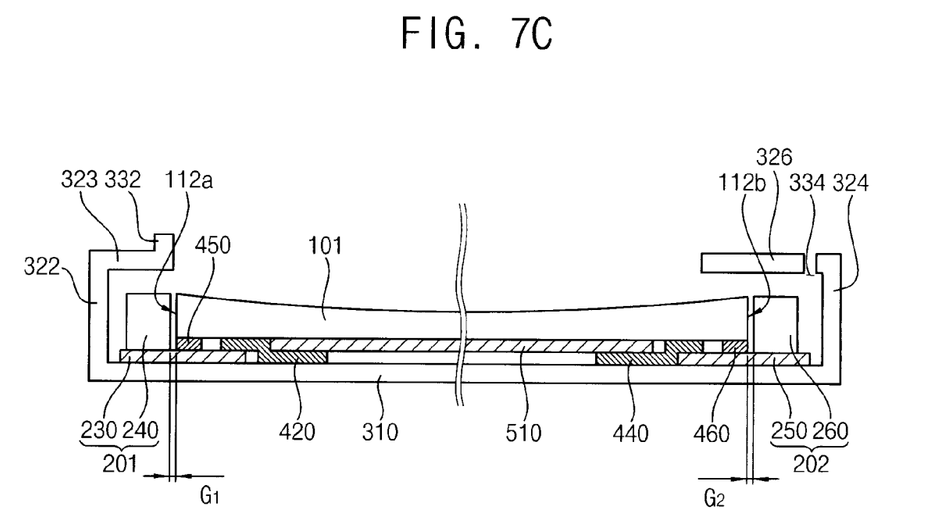

FIGS. 7A, 7B and 7C are cross-sectional views illustrating an exemplary embodiment of a method of assembling the backlight assembly shown in FIG. 5.

Referring to FIG. 7A, the first and second light-emitting modules 201 and 202 are disposed in the receiving space of the receiving container 301.

When the first light-emitting module 201 is disposed on the bottom portion 310, the first circuit board 230 is already combined with the first adhesive member 450 and the main adhesion member 420. Alternatively, the first light-emitting module 201 is disposed on the bottom portion 310 and then the first adhesive member 450 and the main adhesion member 420 are attached to the first circuit board 230. The first light-emitting module 201 is disposed in the first longer side part LR1 of the receiving container 301 to be surrounded by the first supporting portion 323, the first sidewall 322 and the bottom portion 310.

When the second light-emitting module 202 is disposed on the bottom portion 310, the second circuit board 250 is already attached to the second adhesive member 460 and the sub adhesion member 440.

After the first and second light-emitting modules 201 and 22 are received in the receiving space, the reflective sheet 510 is disposed in the receiving space. A plan area of the reflective sheet 510 is smaller than a plan area of an opening portion defined by the first and second supporting portions 323 and 326, a third sidewall and a fourth sidewall of the receiving container 301, which are connected to the first and second sidewalls 322 and 324 so that the reflective sheet 510 is moved toward the bottom portion 310 while being in a substantially parallel position with the bottom portion 310 to be disposed in the receiving space.

When the reflective sheet 510 is received in the receiving space, the first portion of the reflective sheet 510 is disposed on the main adhesion member 420 and the second portion of the reflective sheet 510 is attached to the sub adhesion member 440.

Referring to FIGS. 7B and 7C, the light guide plate 101 is disposed in the receiving space in which the reflective sheet 510 attached to the second circuit board 250 is disposed. A plan area of the light guide surface 120 of the light guide plate 101 is larger than a plan area of the opening portion so that the light guide plate 101 is not disposed in the receiving space while being in a substantially parallel position with the bottom portion 310.

Thus, after the light guide plate 101 is slanted by a predetermined angle to insert an edge portion of the light guide plate 101 at the second longer side part LR2, an outer force (shown by arrows in FIG. 7B) is provided to an opposite edge portion so that the opposite edge portion is disposed on the first adhesive member 450 in disposing the edge portion of the light guide plate 101 on the second adhesive member 460. Then, a distance $G_1$ between the first incident surface 112a and the first light source 240 and a distance $G_2$ between the second incident surface 110b and the second light source 260 are determined.

The outer force is uniformly provided to the entire light guide plate 101 to attach the light guide plate 101 to the main adhesion member 420 and the first adhesive member 450, and to attach the light guide plate 101 to the second adhesive member 460. Thus, the light guide plate 101 attached to the first circuit board 230 by the main adhesion member 420 at the first longer side part LR1 is fixed on the bottom portion 310. In addition, the light guide plate 101 at the second longer side part LR2 is combined with the second circuit board 250 by the second adhesive member 460 to assemble the backlight assembly BL shown in FIGS. 4 and 5.

According to the invention, a light guide plate is stably fixed to a light-emitting module and a receiving container so that a distance between the light guide plate and the light-emitting module may be uniformly maintained. In addition, although the light guide plate is thermally expanded by heat from the light-emitting module, the other elements included in the backlight assembly may move so that the distance between the light guide plate and the light-emitting module may be not changed. Accordingly, the other elements included in the backlight assembly may be hardly deformed by an expansion of the light guide plate, for example, a sheet warpage may be minimized. Thus, a light is hardly lost by a change of the distance between the light guide plate and the light-emitting module, so that the backlight assembly may have better light efficiency and better luminance uniformity.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is

1. A backlight assembly comprising:
    a first light-emitting module including a first circuit board which includes a first mounting surface, and a first light source on the first mounting surface, wherein the first light source generates light;
    a light guide plate on the first mounting surface, wherein the light guide plate guides light from the first light source;
    a receiving container including a bottom portion, wherein the receiving container receives the first light-emitting module and the light guide plate; and
    a main adhesion member
        between the first mounting surface of the first circuit board and the light guide plate, and attached to each of the first circuit board and the light guide plate, and
        between the light guide plate and the bottom portion, and movable with respect to the light guide plate.

2. The backlight assembly of claim 1, wherein the main adhesion member comprises:
    a first base film including a first film portion between the first mounting surface and the light guide plate, and a second film portion between the light guide plate and the bottom portion, wherein the first film portion and the second film portion of the first base film are a single, unitary, indivisible member;
    a first adhesive pattern between the first film portion of the first base film and the first mounting surface;
    a second adhesive pattern between the first film portion of the first base film and the light guide plate; and
    a third adhesive pattern between the second film portion of the first base film and the bottom portion, wherein the second film portion of the first base film is attached to the bottom portion and movable with respect to the light guide plate.

3. The backlight assembly of claim 2, further comprising a first adhesive member which is spaced apart from the main adhesion member, between the first mounting surface and the light guide plate and attached to each of the first circuit board and the light guide plate, wherein the first adhesive member includes a double-sided adhesive tape having an adhesive pattern on both of opposing side surfaces of the double-sided adhesive tape.

4. The backlight assembly of claim 2, further comprising a reflective sheet between the bottom portion and the light guide plate, on the main adhesion member and in contact with the second film portion of the first base film.

5. The backlight assembly of claim 1, further comprising:
a second light-emitting module opposite to the first light-emitting module with respect to the light guide plate, and including a second circuit board including a second mounting surface, and a second light source on the second mounting surface, the light guide plate on the second mounting surface; and
a sub adhesion member
between the second mounting surface and the light guide plate, and attached to the second circuit board, and
between the bottom portion and the light guide plate.

6. The backlight assembly of claim 5, wherein the sub adhesion member comprises:
a second base film including a first film portion between the second mounting surface and the light guide plate, and a second film portion between the light guide plate and the bottom portion, wherein the first film portion and the second film portion of the second base film is a single, unitary, indivisible member; and
a first adhesive pattern between the second mounting surface and the first film portion of the second base film, wherein the first film portion of the second base film is attached to the second circuit board and movable with respect to the light guide plate.

7. The backlight assembly of claim 6,
further comprising a reflective sheet between the bottom portion and the light guide plate, and including a first edge portion, and a second edge portion opposite to the first edge portion,
wherein the first edge portion overlaps the main adhesion member, and the second edge portion overlaps the sub adhesion member,
wherein the sub adhesion member further comprises a second adhesive pattern between the second film portion of the sub adhesion member and the reflective sheet, wherein the second film portion of the sub adhesion member is attached to the reflective sheet.

8. The backlight assembly of claim 7, wherein
the first film portion of the second base film of the sub adhesion member contacts the light guide plate, and
the second film portion of the second base film of the sub adhesion member contacts the bottom portion.

9. The backlight assembly of claim 5, further comprising a second adhesive member which is spaced apart from the sub adhesion member, between the second mounting surface and the light guide plate, and attached to each of the second circuit board and the light guide plate,
wherein the second adhesive member includes a double-sided adhesive tape having an adhesive pattern on both of opposing side surfaces of the double-sided adhesive tape.

10. The backlight assembly of claim 1, further comprising a white printed pattern on the first mounting surface which overlaps the light guide plate.

11. The backlight assembly of claim 1, wherein
the first circuit board further includes an opposite surface to the first mounting surface, wherein the opposite surface faces an inner surface of the bottom portion of the receiving container, and
the main adhesion member is attached to the inner surface of the bottom portion.

12. A backlight assembly comprising:
a first light-emitting module including a first circuit board which includes a first mounting surface, and a first light source on the first mounting surface;
a second light-emitting module facing the first light-emitting module, and including a second circuit board including a second mounting surface, and a second light source on the second mounting surface;
a light guide plate including a first light incident surface, and a second light incident surface opposite to the first light incident surface, respectively overlapping the first circuit board and the second circuit board;
a main adhesion member which is attached to the first circuit board and a first edge portion at the first light incident surface of the light guide plate;
a reflective sheet under the light guide plate, and including an edge portion adjacent to the first edge portion of the light guide plate, which contacts the main adhesion member; and
a sub adhesion member which contacts a second edge portion at the second light incident surface of the light guide plate, and is attached to the reflective sheet.

13. The backlight assembly of claim 12, wherein
the main adhesion member includes a base film, and an adhesive portion on opposing surfaces thereof, and
the reflective sheet contacts the base film of the main adhesion member.

14. The backlight assembly of claim 12, wherein
the sub adhesion member includes a base film, and an adhesive portion on a surface thereof, and
the light guide plate contacts the base film of the sub adhesion member.

15. The backlight assembly of claim 12,
further comprising a receiving container including a bottom portion, wherein the receiving container receives the first and second light-emitting modules, the light guide plate and the reflective sheet,
wherein the main adhesion member includes:
a first surface attached to the bottom portion of the receiving container, and
a second surface which opposes the first surface and faces the reflective sheet, and is movable with respect to the reflective sheet.

16. The backlight assembly of claim 15, wherein
the first and second circuit boards include opposing surfaces to the first mounting surface and the second mounting surface, respectively, which face an inner surface of the bottom portion,
the main adhesion member is attached to the inner surface of the bottom portion, and
the sub adhesion member is movable with respect to the inner surface of the bottom portion.

17. A backlight assembly comprising:
a first light-emitting module including a first circuit board including a first mounting surface, and a first light source on the first mounting surface, wherein the first light source generates light;
a light guide plate which overlaps the first mounting surface and guides a light from the first light source;
a receiving container including a bottom portion, wherein the receiving container receives the first light-emitting module and the light guide plate; and
a main adhesion member including a first portion, a second portion and a stepped portion, wherein the first portion is between the first mounting surface and the light guide plate, the second portion is on the bottom portion, and moveable with respect to the light guide plate, and the stepped portion connects the first and second portions to each other.

18. The backlight assembly of claim 17, further comprising:

a second light-emitting module opposite to the first light-emitting module with respect to the light guide plate, and including a second circuit board including a second mounting surface, and a second light source on the second mounting surface, the light guide plate on the second mounting surface;

a sub adhesion member including a stepped portion which is defined by a first portion, and a second portion connected to the first portion, the first portion being between the second mounting surface and the light guide plate, and the second portion on the bottom portion; and a reflective sheet which is attached to the second portion of the sub adhesion member.

19. A method of assembling a backlight assembly, the method comprising:

attaching a main adhesion member to a first light-emitting module, and attaching a sub adhesion member to a second light-emitting module, each of the light-emitting modules including a light source on a mounting surface of a circuit board;

disposing the first light-emitting module and a second light-emitting module including the main adhesion member and the sub adhesion member, on a bottom portion of a receiving container, such that the second light-emitting module faces the first light-emitting module;

disposing a reflective sheet on the bottom portion such that a first portion of the reflective sheet contacts and is moveable with respect to a portion of the main adhesion member adjacent to the bottom portion, and a second portion opposite to the first portion of the reflective sheet contacts a portion of the sub adhesion member adjacent to the bottom portion; and disposing a light guide plate on the bottom portion including the reflective sheet such that opposing light incident surfaces of the light guide plate respectively overlap the mounting surfaces of the circuit boards, thereby attaching the light guide plate to the main adhesion member.

20. The method of claim 19, wherein the disposing the light guide plate on the bottom portion comprises:

disposing an edge portion of the light guide plate on the mounting surface of the second light-emitting module in a receiving space of the receiving container, while disposing an opposite edge portion to the edge portion of the light guide plate at an outside of the receiving container;

pressing the opposite edge portion of the light guide plate from the outside of the receiving container to the receiving space; and disposing the opposite edge portion of the light guide plate on the mounting surface of the first light-emitting module.

* * * * *